US012807125B2

(12) United States Patent
Zhang et al.

(10) Patent No.: US 12,807,125 B2
(45) Date of Patent: Nov. 24, 2026

(54) METHOD AND DEVICE FOR TORQUE CONTROL OF A DRIVE MOTOR DURING GEAR SHIFTS

(71) Applicant: Robert Bosch GmbH, Stuttgart (DE)

(72) Inventors: Hantian Zhang, Wuxi (CN); Bo Wei, Wuxi (CN); Chengjun Tao, Wuxi (CN); Peng Rui, Wuxi (CN)

(73) Assignee: Robert Bosch GmbH, Stuttgart (DE)

(*) Notice: Subject to any disclaimer, the term of this patent is extended or adjusted under 35 U.S.C. 154(b) by 95 days.

(21) Appl. No.: 18/793,826

(22) Filed: Aug. 4, 2024

(65) Prior Publication Data

US 2025/0050862 A1 Feb. 13, 2025

(30) Foreign Application Priority Data

Aug. 7, 2023 (CN) ........................ 202310987335.6

(51) Int. Cl.
*B60W 10/08* (2006.01)

(52) U.S. Cl.
CPC ....... *B60W 10/08* (2013.01); *B60W 2710/083* (2013.01)

(58) Field of Classification Search
None
See application file for complete search history.

(56) References Cited

U.S. PATENT DOCUMENTS

2014/0372012 A1* 12/2014 Darnell ................ B60W 50/10 701/115
2021/0237740 A1* 8/2021 Watanabe .............. F16H 63/50
2021/0387610 A1* 12/2021 Jeong .................... B60W 10/06
2023/0151886 A1* 5/2023 Brockley ............... F16H 63/50 701/51

FOREIGN PATENT DOCUMENTS

WO 2022/118896 A1 6/2022

* cited by examiner

*Primary Examiner* — Davin Seol
(74) *Attorney, Agent, or Firm* — Maginot, Moore & Beck LLP

(57) ABSTRACT

A method for torque control of a drive motor during gear shifts is disclosed. The method includes sending a plurality of torque reduction commands to the motor control unit during the torque reduction phase of a gear shift. Each of the plurality of torque reduction commands has different step lengths. During the initial period of the torque reduction phase, the torque reduction slope gradually increases. And during the end period of the torque reduction phase, the torque reduction slope gradually decreases.

9 Claims, 4 Drawing Sheets

METHOD AND DEVICE FOR TORQUE CONTROL OF A DRIVE MOTOR DURING GEAR SHIFTS

This application claims priority under 35 U.S.C. § 119 to patent application no. CN 2023 1098 7335.6, filed on Aug. 7, 2023 in China, the disclosure of which is incorporated herein by reference in its entirety.

The present application relates to vehicle gear shift control, and specifically relates to a method and device, a computer storage medium, a computer program product, and a transmission controller for torque control of a drive motor during a vehicle gear shift.

BACKGROUND

For a transmission of an electric vehicle without a clutch, the transmission cannot unload and load the torque of the drive motor with the clutch during a gear shift, so separate control of the motor is required to achieve torque coordination.

Automated mechanical transmissions (AMTs) are widely used in commercial electric vehicles. A gear shift of this type of transmission usually includes the stages of torque reduction, gear disengagement, speed adjustment, gear engagement, and torque increase, of which control of torque reduction and torque increase will affect the smoothness of the gear shift and the driving performance of the vehicle.

SUMMARY

The present application provides a solution that is intended to reduce jerkiness during gear shifts.

According to a first aspect of the present application, a method for torque control of a drive motor during gear shifts is disclosed, comprising the following: sending a plurality of torque reduction commands to the motor control unit during the torque reduction phase of a gear shift, of which each of the plurality of torque reduction commands has different step lengths, wherein, during the initial period of the torque reduction phase, the torque reduction slope gradually increases, and during the end period of the torque reduction phase, the torque reduction slope gradually decreases.

In one or more examples of the first aspect of the present application, optionally, in the torque reduction phase, the torque reduction step length scheme is determined based on the current gear position.

In one or more examples of the first aspect of the present application, optionally, in the torque reduction phase, the torque reduction step length indicated by the torque reduction commands is determined based on at least the current torque of the drive motor and the pedal signal look-up table.

In one or more examples of the first aspect of the present application, optionally, during the torque increase phase of a gear shift, a plurality of torque increase commands are sent to the motor control unit, of which each of the plurality of torque increase commands has different step lengths, wherein, during the initial period of the torque increase phase, the torque increase slope gradually increases, and during the end period of the torque increase phase, the torque increase slope gradually decreases.

In one or more examples of the first aspect of the present application, optionally, at the start time point of the torque reduction phase, the absolute value of the torque reduction slope indicated by the torque reduction commands sent to the motor control unit is consistent with the slope of the vehicle torque request; optionally, at the end time point of the torque increase phase, the torque increase slope indicated by the torque increase commands sent to the drive motor controller is consistent with the slope of the vehicle torque request.

In one or more examples of the first aspect of the present application, optionally, in the torque increase phase, the torque increase step length scheme is determined based on the current gear position.

In one or more examples of the first aspect of the present application, optionally, in the torque increase phase, the torque increase step length indicated by the torque increase commands is determined based on at least the current torque of the drive motor and the pedal signal look-up table.

According to a second aspect of the present application, a transmission control unit storing computer program instructions is disclosed, with the control unit comprising a processor and a memory, wherein the memory stores computer program instructions, and when the computer program instructions are executed by the processor, the processor is capable of executing one or more steps according to the method described in the first aspect of the present application.

According to a third aspect of the present application, a computer program product storing computer program instructions is disclosed, and when the computer program instructions are executed by a processor, the processor is capable of executing one or more steps according to the method described in the first aspect of the present application.

According to a fourth aspect of the present application, a computer-readable storage medium instructions storing commands is disclosed, and when the commands are executed by a processor, the processor is capable of executing one or more steps according to the method described in the first aspect of the present application.

According to a fifth aspect of the present application, a device for torque control of a drive motor during a gear shift is disclosed, comprising: a first module for sending a plurality of torque reduction commands to the motor control unit during the torque reduction phase of a gear shift, of which each of the plurality of torque reduction commands has different step lengths, wherein, during the initial period of the torque reduction phase, the torque reduction slope gradually increases, and during the end period of the torque reduction phase, the torque reduction slope gradually decreases.

In one or more examples of the fifth aspect of the present application, optionally, the device comprises a second module for determining the torque reduction step length scheme based on the current gear position in the torque reduction phase.

In one or more examples of the fifth aspect of the present application, optionally, in the torque reduction phase, the above second module determines the torque reduction step length indicated by the torque reduction commands based on at least the current torque of the drive motor and the pedal signal look-up table.

In one or more examples of the fifth aspect of the present application, optionally, the device comprises a third module for sending a plurality of torque increase commands to the motor control unit during the torque increase phase of a gear shift, of which each of the plurality of torque increase commands has different step lengths, wherein, during the initial period of the torque increase phase, the torque increase slope gradually increases, and during the end period of the torque increase phase, the torque increase slope gradually decreases.

In one or more examples of the fifth aspect of the present application, optionally, at the end time point of the torque increase phase, the torque increase slope indicated by the torque increase commands sent by the above third module to the motor control unit is consistent with the slope of the vehicle torque request.

In one or more examples of the fifth aspect of the present application, optionally, the device comprises a fourth module for determining the torque increase step length scheme based on the current gear position in the torque increase phase.

In one or more examples of the fifth aspect of the present application, optionally, in the torque increase phase, the fourth module determines the torque increase step length indicated by the torque increase commands based on at least the current torque of the drive motor and the pedal signal look-up table.

The inventors of this application have noticed issues with torque adjustment during gear shifts in the prior art, and using a motor torque output with variable slope to reduce jerkiness during gear shifts helps improve the driving performance of the vehicle.

BRIEF DESCRIPTION OF THE DRAWINGS

The principles, features and advantages of the present disclosure will be more fully understood by referring to the detailed description of the specific exemplary embodiments with reference to the accompanying drawings.

DETAILED DESCRIPTION

To provide a clearer understanding of the technical problems, technical solutions, and beneficial technical effects to be addressed by the present disclosure, the following detailed description of the present disclosure will be provided with reference to the accompanying drawings and multiple exemplary examples. It should be understood that the specific examples described herein are provided solely for the purpose of explaining the present disclosure and not for limiting the scope of protection of the present disclosure. Those skilled in the art will easily recognize that the same principles can be applied to systems other than the vehicle gear shift control system described herein. Furthermore, these same or similar principles can be implemented in these other systems and any such variations do not depart from the spirit and scope of the present disclosure.

Figure 1:
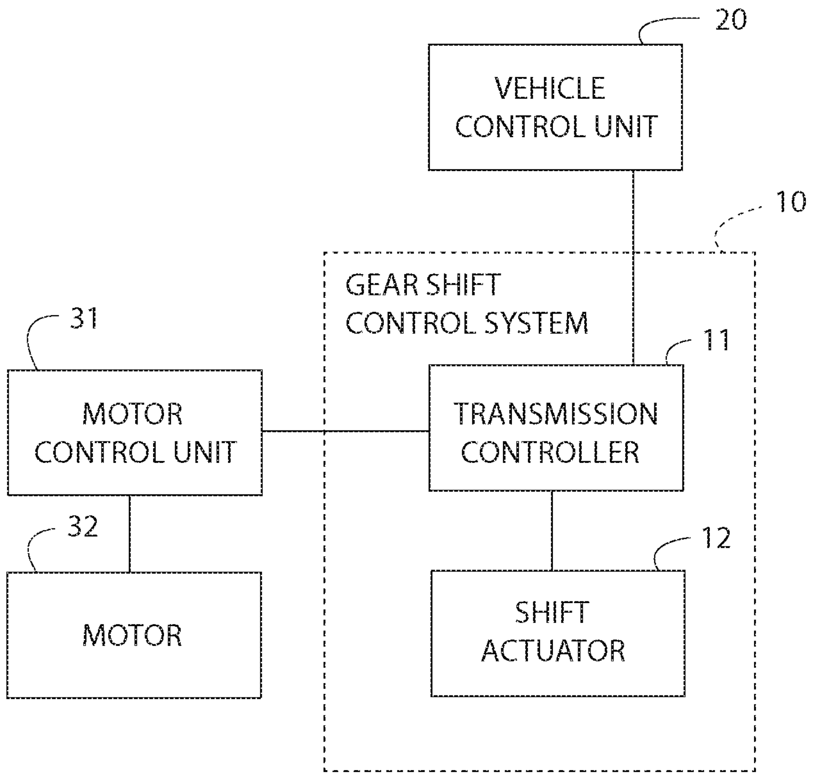
FIG. 1 is a block diagram of a vehicle gear shift control system according to an example of the present application.

FIG. 1 is a block diagram of a vehicle gear shift control system according to an example of the present application. As shown in FIG. 1, the gear shift control system 10, i.e., the transmission system 10, comprises a transmission control unit 11 (TCU) and a gear shift actuator 12. The TCU 11 is electrically connected to the shift gear shift actuator 12. The TCU 11 is capable of controlling the shift actuator 12 to switch gears based on, for example, vehicle speed signals, accelerator pedal signals, etc., and gear shift strategies stored in the transmission controller 11. The gear shift actuator 12 may be, for example, an electronically controlled electric gear shift mechanism. The TCU 11 may control the start and stop and rotational speed of the gear shift motor of the gear shift actuator 12 via a gear shift motor driver (not shown in the figure). The rotation of the output of the gear shift motor is converted into the axial movement of the shifting fork in the direction of the input shaft of the transmission system through transmission components. The axial movement of the shifting fork drives the shifting sleeve or synchronizer, causing the shifting gear to engage or disengage with the transmission gear, thereby achieving gear engagement or disengagement.

The TCU 11 and the vehicle control unit 20 (VCU) may be communicatively coupled via the CAN bus. The VCU 20 is capable of sending signals such as vehicle torque requests, vehicle speed signals, and accelerator pedal signals to the TCU 11.

The TCU 11 is capable of sending signals such as gear position information and drive motor torque to the VCU 20.

The TCU 11 and the motor control unit (MCU) 31 may be communicatively coupled via the CAN bus. The TCU 11 is capable of sending commands such as motor operation mode, target motor rotational speed, and target motor torque to the MCU 31, while the MCU 31 may send information such as the current motor operation mode, current motor rotational speed, and current motor torque to the TCU 11. The MCU 31 is electrically connected to the motor 32 and controls the operation of the motor 32. The motor 32 may be a permanent magnet synchronous motor. The motor 32 is mechanically coupled to the gears in the transmission, thereby transmitting the output torque of the motor 32 to the wheels of the vehicle through the gear set.

Figure 2:
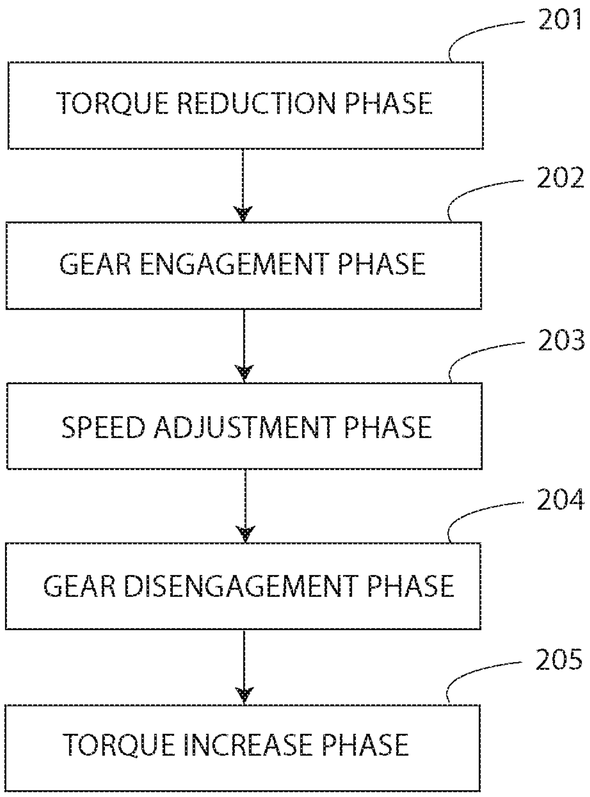
FIG. 2 is a schematic diagram of a vehicle gear shift control process according to an example of the present application.

FIG. 2 is a schematic diagram of a vehicle gear shift control process according to an example of the present application. FIG. 2 schematically illustrates stages 201 through 205 during a gear shift. In this example, the gear shift process is briefly described by taking an electrically-driven multi-gear transmission as an example.

A gear shift comprises a torque reduction phase 201, a gear engagement phase 202, a speed adjustment phase 203, a gear disengagement phase 204, and a torque increase phase 205.

In one example, the TCU determines whether to initiate a gear shift operation based on signals such as the accelerator pedal signal, vehicle speed signal, and gear shift strategies stored in the TCU.

It will be appreciated by those skilled in the art that the decision of whether a gear shift operation should be triggered may also be executed by the VCU. For example, the VCU may determine whether to initiate a gear shift operation based on signals such as the accelerator pedal signal, brake pedal signal, vehicle speed signal, and other vehicle status/environmental information, according to the gear shift strategies stored in the VCU. When the VCU determines judges that a gear shift is necessary, it calculates the target motor torque, target motor rotational speed, and motor operation mode of the drive motor, and determines the target gear position and gear shift command flag. The target motor torque, target motor rotational speed, motor operation mode, target gear position, and gear shift command flag are sent via the CAN bus to the MCU and/or TCU. The MCU receives the target motor torque, target motor rotational speed, and motor operation mode from the CAN bus; in torque mode, it controls the drive motor output torque based on the target motor torque, and in rotational speed mode, it controls the drive motor output speed based on the target motor rotational speed. The TCU receives target gear positions and shift command flags from the CAN bus, and controls the gear shift actuator to perform gear engagement and disengagement operations.

In this example, before the gear shift begins, the MCU receives a vehicle torque request from the VCU and adjusts the motor torque; when the TCU triggers the gear shift, the MCU receives the torque request from the TCU and enters the gear shift phase. In another example, instead of entering the gear shift phase directly based on gear shift conditions, the TCU may first send a gear shift request to the VCU, and then enter the gear shift phase in response to a permissive shift command from the VCU.

Refer to the schematic diagram of the vehicle gear shift control process shown in FIG. 2.

In the torque reduction phase 201, the TCU sends a torque reduction command to the MCU to reduce the output torque of the drive motor to the target torque. Due to the absence of a clutch, torque reduction cannot be achieved through mechanical disengagement. In this phase, the TCU controls the motor to operate in torque mode, where the target torque (e.g., zero torque) brings the engaged gears close to a no-load synchronous state to prepare for the next step of gear disengagement.

In the gear disengagement phase 202, the TCU controls the shifting fork to move axially in the direction of the input shaft of the transmission system, pushing the shifting sleeve to disengage from the transmission gear. Specifically, when the TCU receives the torque reduction end signal from the MCU, it controls the gear shift motor in the gear shift actuator to bring the shifting fork to the neutral position.

During the speed adjustment phase 203, the TCU sends a target rotational speed signal to the MCU. In this phase, the TCU controls the motor to operate in rotational speed mode. The MCU adjusts the motor speed based on this target rotational speed signal, controlling the speed difference between the synchronous side and the non-synchronous side within a predetermined range to reduce gear engagement shock.

In the gear engagement phase 204, the TCU again controls the shifting fork, pushing the shifting sleeve into engagement with the transmission gear. In this phase, the TCU controls the motor to re-enter torque mode. Specifically, when the TCU receives the speed adjustment end signal from the MCU, it controls the shifting gear to engage with the transmission gear of the target gear position.

In the torque increase phase 205, the TCU sends a torque increase command to the MCU to increase the output torque of the drive motor to the target torque. The target torque may be determined by the VCU according to the current acceleration pedal signal, vehicle speed signal and other information.

Figure 3A:
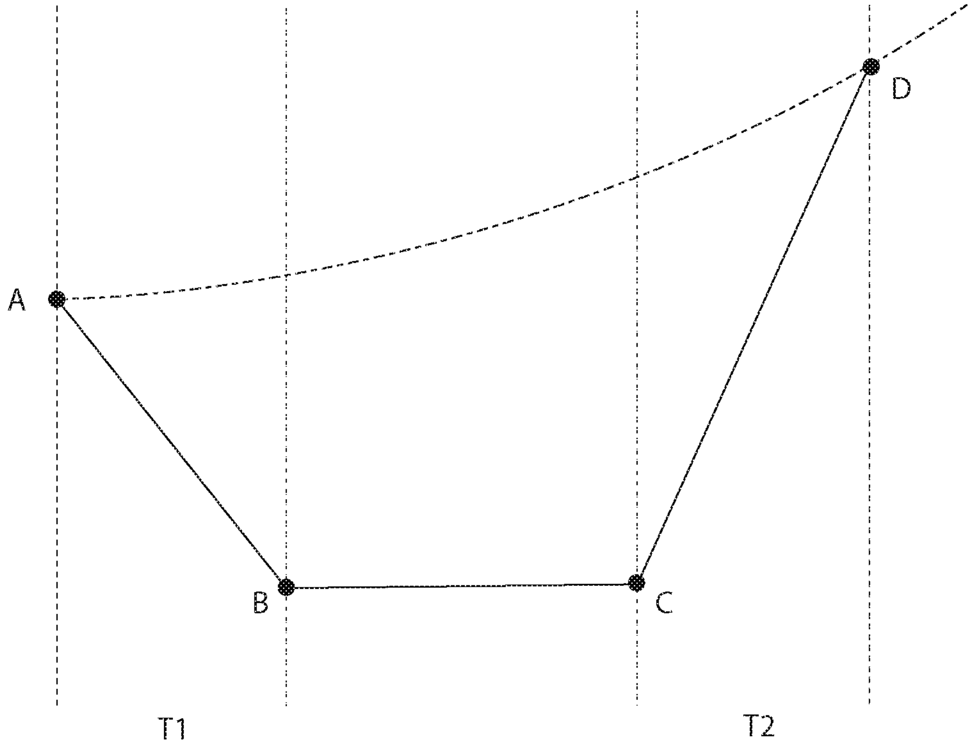
FIG. 3A is a schematic diagram illustrating torque control of a drive motor during a gear shift in the prior art.

FIG. 3A is a schematic diagram illustrating torque control of a drive motor during a gear shift in the prior art. As discussed in FIG. 2 above, the gear shift phase comprises stages such as torque decrease, gear disengagement, speed adjustment, gear engagement and torque increase. For ease of discussion, FIG. 3A illustrates the torque reduction phase T1 and the torque increase phase T2 as separated by vertical dashed lines, wherein the solid line in the figure illustrates the variation of the drive motor torque with time, and the dotted line in the figure illustrates the variation of the vehicle torque request of with time.

In existing schemes, during the torque reduction period T1 from point A to point B, the MCU receives, for example, a torque reduction command from the TCU, and the drive motor's output torque is reduced to a target torque at point B, which may be zero torque or a torque value near zero torque. It can be seen that torque decreases from point A to point B according to a fixed slope, i.e., the torque commands received each time (e.g., every 10 ms) by the MCU has the same torque step length. Due to the difference between the fixed torque slope requested by the TCU in the torque reduction phase T1 in FIG. 3A and the vehicle torque request slope generated by the VCU at point A, the vehicle will experience a jerk during the initial stage of torque reduction. At point B, the fixed torque slope requested by the TCU in the torque reduction phase T1 is immediately changed to zero, so the vehicle will experience another jerk at point B.

To address this situation, one example of the present disclosure eliminates the jerks generated during the motor torque control stage of the gear shift process by optimizing the motor torque during the torque reduction phase, thereby reducing the overall jerk during the gear shift process. In this example, during the torque reduction phase of a gear shift, a plurality of torque reduction commands are sent to the MCU, of which each of the plurality of torque reduction commands has different step lengths, wherein, during the initial period of the torque reduction phase, the torque reduction slope gradually increases, and during the end period of the torque reduction phase, the torque reduction slope gradually decreases. The sum of the initial period and the end period is less than or equal to the duration of the torque reduction phase.

Figure 3B:
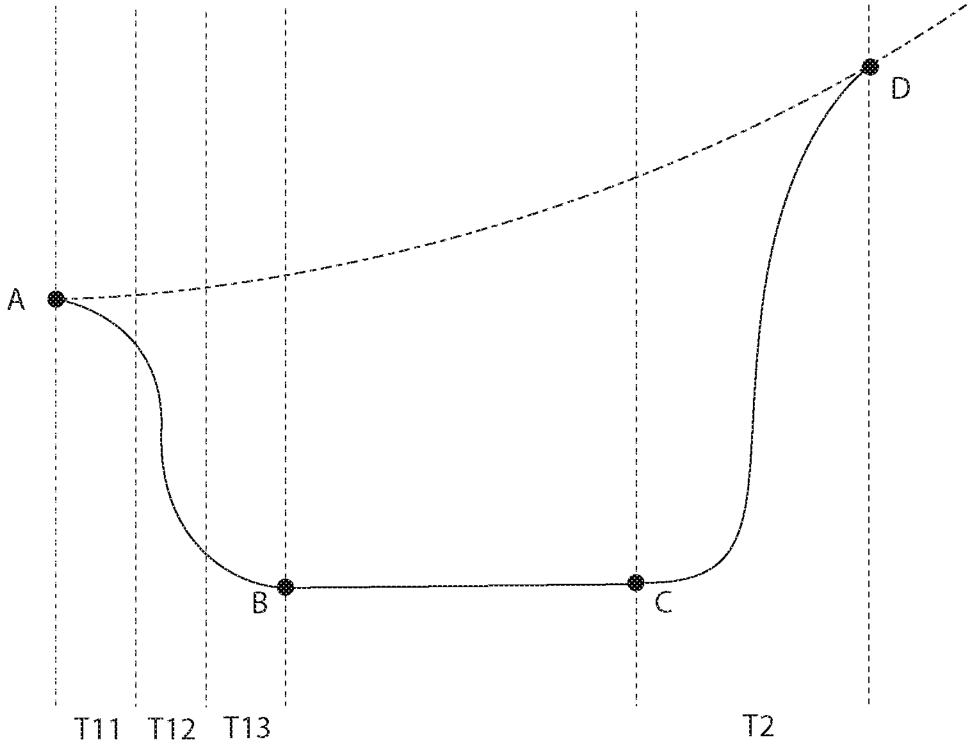
FIG. 3B is a schematic diagram illustrating torque control of a drive motor during a gear shift according to one example of the present application.

As shown in FIG. 3B, in the torque reduction phase corresponding to FIG. 3A, a torque reduction curve with a varying slope is generated to eliminate the jerks produced during the motor torque control phase in the gear shift process, thereby reducing the overall jerkiness during the gear shift process. In FIG. 3B, during the period of torque reduction from point A to point B, the MCU receives, for example, torque reduction commands from the TCU. The torque decreases from point A to point B based on a varying slope, i.e., the plurality of torque reduction commands received by the MCU has different torque reduction step lengths.

In one example, the period of torque reduction from point A to point B in FIG. 3B can be divided into the initial period T11, the intermediate period T12, and the end period T13 of the torque reduction phase. During the initial period T11 of the torque reduction phase, the torque reduction slope gradually increases. During the intermediate period T12, torque may be adjusted downward with a larger slope. During the end period T13, the torque reduction slope gradually decreases. Among these, during the initial period T11 of the torque reduction phase, the torque step length gradually increases, and at the beginning of this period T11, the absolute value of the torque slope may be equal to or close to the slope of the vehicle torque request. During the end period T13, the torque reduction slope gradually decreases to zero. It will be appreciated by those skilled in the art that the torque reduction step of the vehicle under different operating conditions may be determined by way of calibration.

As mentioned above, in existing schemes, during the period of torque reduction from point A to point B, torque decreases from point A to point B according to a fixed slope, i.e., the torque commands received each time (e.g., every 10 ms) by the MCU has the same torque step length. Similarly, in the torque increase phase T2 in FIG. 3A, torque increases from point C to point D according to a fixed slope, i.e. the torque commands received each time (e.g., every 10 ms) by the MCU has the same torque step length. Due to the difference between the fixed torque slope requested by the TCU and that of the vehicle torque request generated by the VCU at point D, the vehicle will experience a jerk in the final stage of torque increase. At point C, the torque slope requested by the TCU in the torque increase phase T2 is immediately changed from zero to a fixed slope, so the vehicle will experience another jerk at point C.

To address this situation, one example of the present disclosure eliminates the jerks generated during the motor torque control stage of the gear shift process by optimizing the motor torque during the torque increase phase, thereby reducing the overall jerk during the gear shift process. In this example, during the torque increase phase of a gear shift, a plurality of torque increase commands are sent to the MCU, of which each of the plurality of torque increase commands has different step lengths, wherein, during the initial period of the torque increase phase, the torque increase slope gradually increases, and during the end period of the torque increase phase, the torque increase slope gradually decreases. The sum of the initial period and the end period is less than or equal to the duration of the torque increase phase.

As shown in FIG. 3B, in the torque increase phase corresponding to FIG. 3A, a torque increase curve with a varying slope is generated to eliminate the jerks produced during the motor torque control phase in the gear shift process, thereby reducing the overall jerkiness during the gear shift process. In FIG. 3B, during the period of torque reduction from point C to point D, the MCU receives, for example, torque increase commands from the TCU. The torque increases from point C to point D based on a varying slope, i.e., the plurality of torque increase commands received by the MCU has different torque increase step lengths.

In one example, the period of torque increase T2 from point C to point D in FIG. 3B can be divided into the initial period, the intermediate period, and the end period of the torque increase phase. During the initial period of the torque increase phase, the torque increase slope gradually increases. During the intermediate period, torque may be adjusted upward with a larger slope. During the end period, the torque increase slope gradually decreases. Among these, during the end period of the torque increase phase, the torque step length gradually increases, and at the end of this period, the absolute value of the torque slope may be equal to or close to the slope of the vehicle torque request. It will be appreciated by those skilled in the art that the torque increase step of the vehicle under different operating conditions may be determined by way of calibration.

In the above example, by varying the slope of the motor torque, it is possible to avoid jerks caused by changes in motor torque during the torque reduction and torque increase phases of gear shifts, reduce transmission system vibrations, improve the drivability of the vehicle, and simultaneously maintain the vehicle's dynamics by controlling the slope of the motor torque (e.g., the higher torque slopes in the intermediate periods of the torque reduction and torque increase phases).

Figure 4:
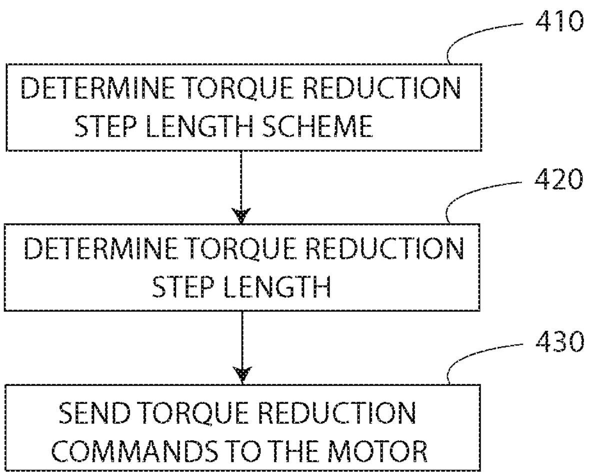
FIG. 4 is a flow chart illustrating the torque control executed by a transmission control unit according to one example of the present application.

FIG. 4 is a flow chart illustrating the torque control executed by a transmission control unit according to one example of the present application. The TCU may be the TCU 11 as depicted in FIG. 1.

The steps in FIG. 4 apply to torque control during the torque decrease and torque increase phases of a gear shift. Taking torque control during the torque reduction phase of a gear shift as an example, in step 410, the torque reduction step length scheme is determined based on the current gear position. A corresponding torque step adjustment scheme may be set for each gear position. The torsion step length scheme is used to determine the torque slope. In step 420, the torque reduction step length indicated by the torque reduction commands is determined based on at least the current torque of the drive motor and the pedal signal look-up table. In a specific example, the torque reduction step length of the current cycle may be determined based on a comparison of the current motor torque with the motor torque of the previous cycle and the pedal signal lookup table. It will be appreciated by those skilled in the art that lookup table may be obtained through calibration. In step 430, torque reduction commands of the current cycle are sent to the motor drive. This completes the sending of a torque reduction command. This example of the present application can dynamically adjust the torque reduction commands sent within a period of time, ensuring that each torque reduction command sent has a different step length compared to the previous one, thus avoiding unreasonable changes in slope that may cause jerks during a gear shift.

The torque control process executed by the TCU in FIG. 4 may be implemented by one or more software functional units of the TCU. The division of functional units is a logical functional division, and there may be other division methods during implementation. A plurality of units and devices may be physically separated or may be distributed over network units, which may be combined or may be integrated into another system.

The various steps in the flow charts in FIG. 2 and FIG. 4 may be realized through computer program instructions. These computer program instructions may be provided to the processor of a general-purpose computer, a dedicated computer, or other programmable data-processing device to create a machine for the purpose of the execution of these instructions by the processor of the computer or other programmable data-processing device. In some alternative implementations, the steps shown in the boxes may not occur in the sequence as depicted in the flow chart. For example, two boxes shown in sequence may actually be executed in a substantially simultaneous manner or in a different order.

Figure 5:
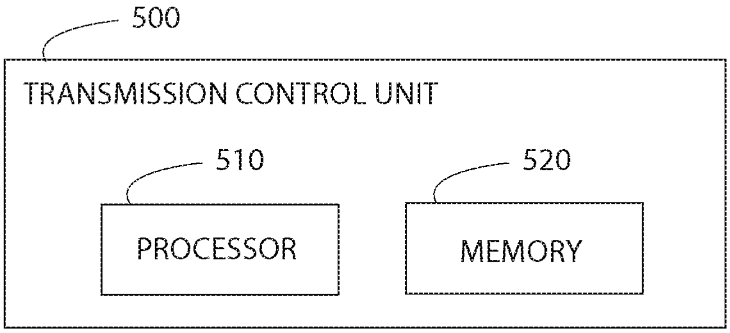
FIG. 5 is a block diagram of a transmission control unit according to one example of the present application.

FIG. 5 is a block diagram of a TCU according to one example of the present application. A vehicle TCU 500 is configured to implement, for example, control operations of the TCU 11 in FIG. 1, and is applied to the control methods shown in FIG. 2 and FIG. 4. The TCU 500 may comprise a processor 510 and a memory 520. The processor 510 and the memory 520 communicate via a bus, or may communicate via other ways such as wireless transmission. The memory 520 is configured to store instructions and the processor 510 is configured to execute the instructions stored by the memory 520. The memory 520 may be a read-only memory (ROM) or a random access memory (RAM). The processor 510 may invoke program code stored in the memory 520 to perform a plurality of steps of the method described above. The TCU 500 further comprises an internal memory and communication interface not shown in FIG. 5.

The TCU 500 communicates with various vehicle electronic components via an input/output (I/O) interface. Computer program code stored in the memory 520 is loaded into the internal memory, and is then executed by the processor 510.

The above one or more examples and one or more examples may be realized in whole or in part through software, hardware, or combinations thereof. When using software, they may be realized in whole or in part in the form of a computer program product. The computer program product comprises computer program instructions that may be downloaded to the memory of a controller via a computer network or may be transmitted to the memory of the controller in a wired fashion. When the computer program instructions are executed by the processor of the controller, the processor is capable of executing one or more steps of the method described herein. The computer program instructions may be provided in the form of a computer-readable storage medium. The computer-readable storage medium referred to herein may be any usable medium that can be accessed by a general-purpose or dedicated computer.

The above descriptions are only specific examples of the present application, and the protection scope of the present application is not limited thereto. Those skilled in the art may contemplate other feasible modifications or substitutions based on the technical content and guidance disclosed in the present application, and all such modifications or substitutions fall within the scope of protection of the present application. Where appropriate, the examples of the present application and the features of the examples may be combined with each other. The scope of protection of the present application is subject to the scope of protection of the patent claims.

What is claimed is:

1. A method for torque control of a drive motor during gear shifts, comprising:

sending a plurality of torque reduction commands to a motor control unit of the drive motor during a torque reduction phase of a gear shift in order to reduce a torque of the drive motor, each torque reduction command of the plurality of torque reduction commands having a corresponding reduction step length of a plurality of reduction step lengths, each reduction step length of the plurality of reduction step lengths being different, wherein, during an initial reduction period of the torque reduction phase, a torque reduction slope of the torque of the drive motor gradually increases, and during an end reduction period of the torque reduction phase, the torque reduction slope of the torque of the drive motor gradually decreases, and wherein in the torque reduction phase, each reduction step length of the plurality of reduction step lengths is determined based on at least a current torque of the drive motor and a pedal signal look-up table.

2. The method according to claim 1, wherein:

in the torque reduction phase, a torque reduction step length scheme is determined based on a current gear position, and the torque reduction step length scheme includes the plurality of reduction step lengths.

3. The method according to claim 1, wherein:

a plurality of torque increase commands are sent to the motor control unit during a torque increase phase of a gear shift in order to increase a torque of the drive motor, each torque increase command of the plurality of torque increase commands having a corresponding increase step length of a plurality of increase step lengths, each increase step length of the plurality of increase step lengths being different, wherein, during an initial increase period of the torque increase phase, a torque increase slope gradually increases, and during an end increase period of the torque increase phase, the torque increase slope gradually decreases.

4. The method according to claim 1, wherein:

at a start time point of the torque reduction phase, an absolute value of the torque reduction slope indicated by the torque reduction commands sent to the motor control unit is consistent with a slope of a vehicle torque request, and at an end time point of the torque increase phase, the torque increase slope indicated by the torque increase commands sent to the motor control unit is consistent with the slope of the vehicle torque request.

5. The method according to claim 3, wherein:

in the torque increase phase, a torque increase step length scheme is determined based on a current gear position, and the torque increase step length scheme includes the plurality of increase step lengths.

6. The method according to claim 3, wherein:

in the torque increase phase, each increase step length of the plurality of increase step lengths is determined based on at least the current torque of the drive motor and the pedal signal look-up table.

7. A transmission control unit, comprising:

a processor; and a non-transitory memory operably connected to the processor, wherein the non-transitory memory stores computer program instructions, and wherein when the computer program instructions are executed by the processor, the processor is capable of executing the method according to claim 1.

8. A computer program product comprising computer program instructions, wherein when the computer program instructions are executed by a processor, the processor is capable of executing the method according to claim 1.

9. A non-transitory computer-readable storage medium, wherein:

the non-transitory computer-readable storage medium stores instructions, and when the instructions are executed by a processor, the processor is capable of executing the method according to claim 1.

* * * * *